Aug. 12, 1969     H. D. BURKHALTER     3,460,594
TREE HARVESTING APPARATUS AND METHOD
Filed Oct. 4, 1966     6 Sheets-Sheet 1

FELL

DELIMB

TOP

SKID

LOAD

POSITION

FELL

SKID

MULTIPLE SKID

LOAD

INVENTOR
H.D. BURKHALTER
BY Burns, Doane, Benedict, Swecker & Mathis
ATTORNEYS

Aug. 12, 1969  H. D. BURKHALTER  3,460,594
TREE HARVESTING APPARATUS AND METHOD
Filed Oct. 4, 1966  6 Sheets-Sheet 2

INVENTOR
H.D. BURKHALTER
ATTORNEYS

Aug. 12, 1969    H. D. BURKHALTER    3,460,594
TREE HARVESTING APPARATUS AND METHOD
Filed Oct. 4, 1966    6 Sheets-Sheet 3
FIG. 5
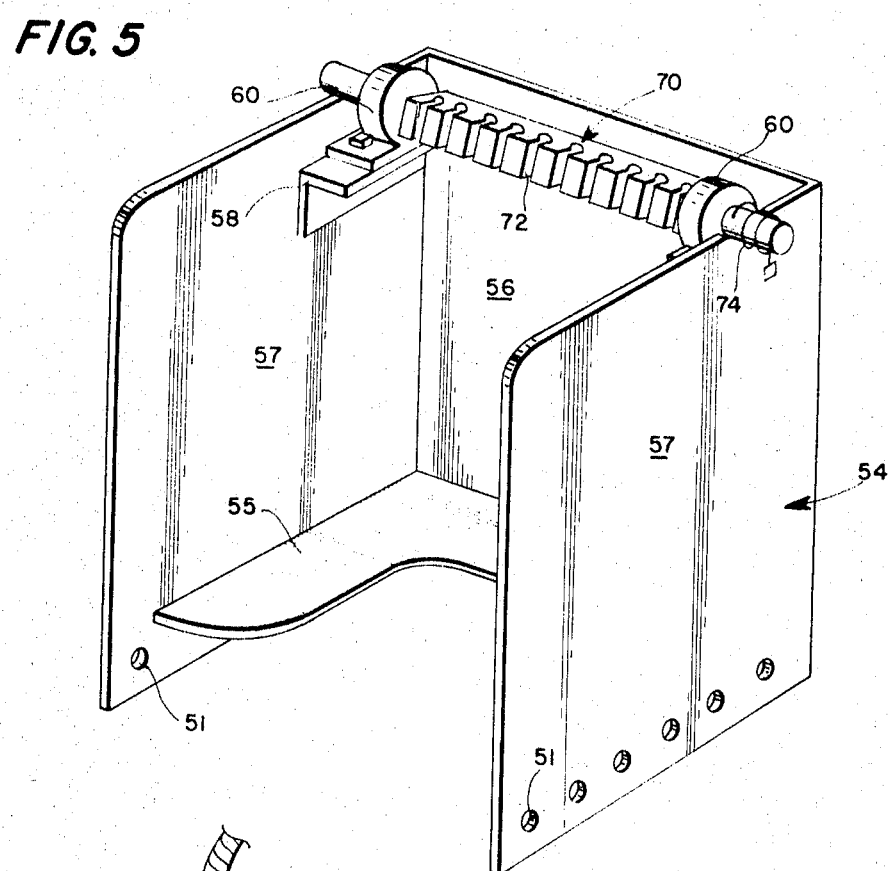
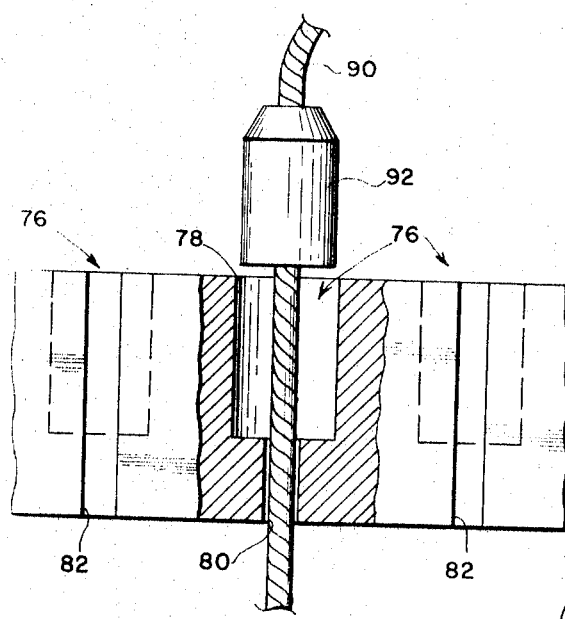
FIG. 6
INVENTOR
H.D BURKHALTER
BY Birns, Doane, Benedict, Swecker & Mathis
ATTORNEYS Aug. 12, 1969    H. D. BURKHALTER    3,460,594
TREE HARVESTING APPARATUS AND METHOD
Filed Oct. 4, 1966    6 Sheets-Sheet 4

INVENTOR
H.D. BURKHALTER
BY Burns, Doane, Benedict, Swecker & Mathis
ATTORNEYS

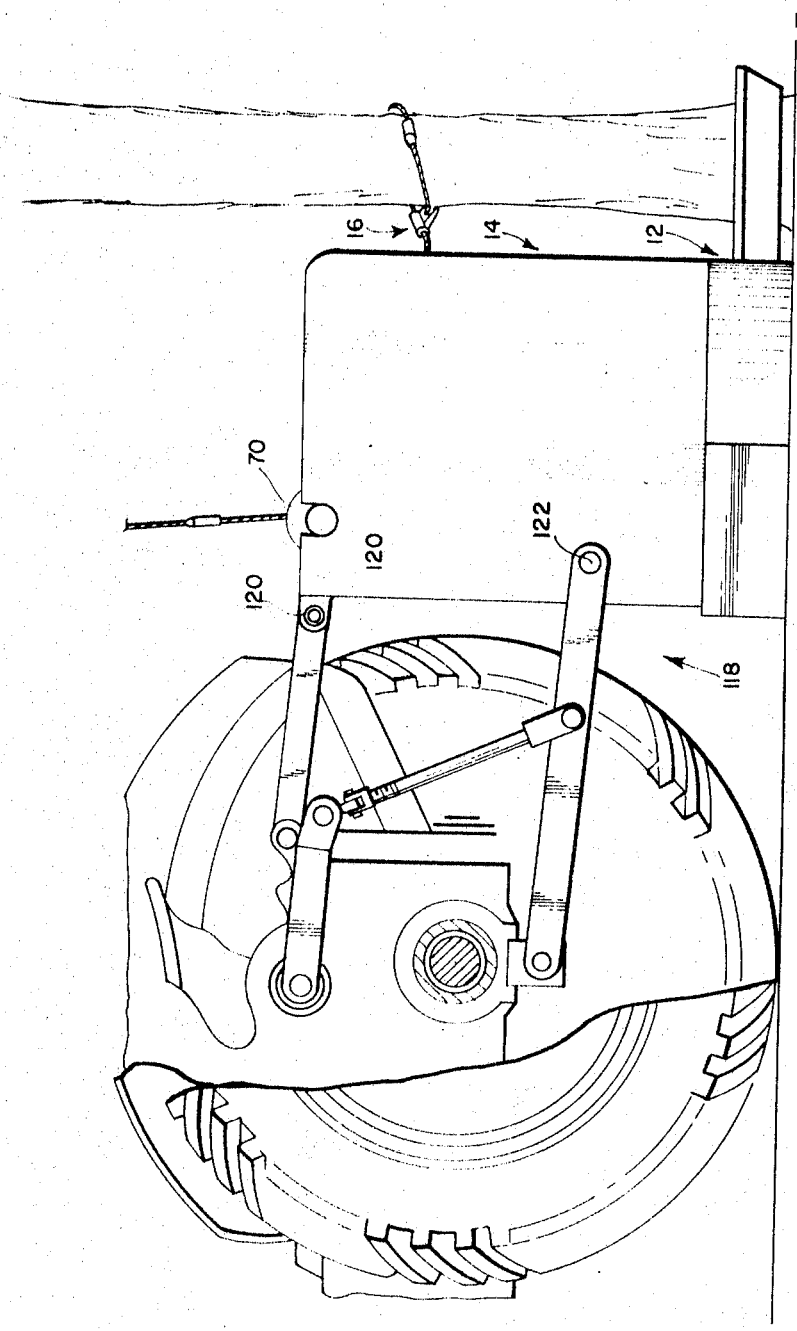

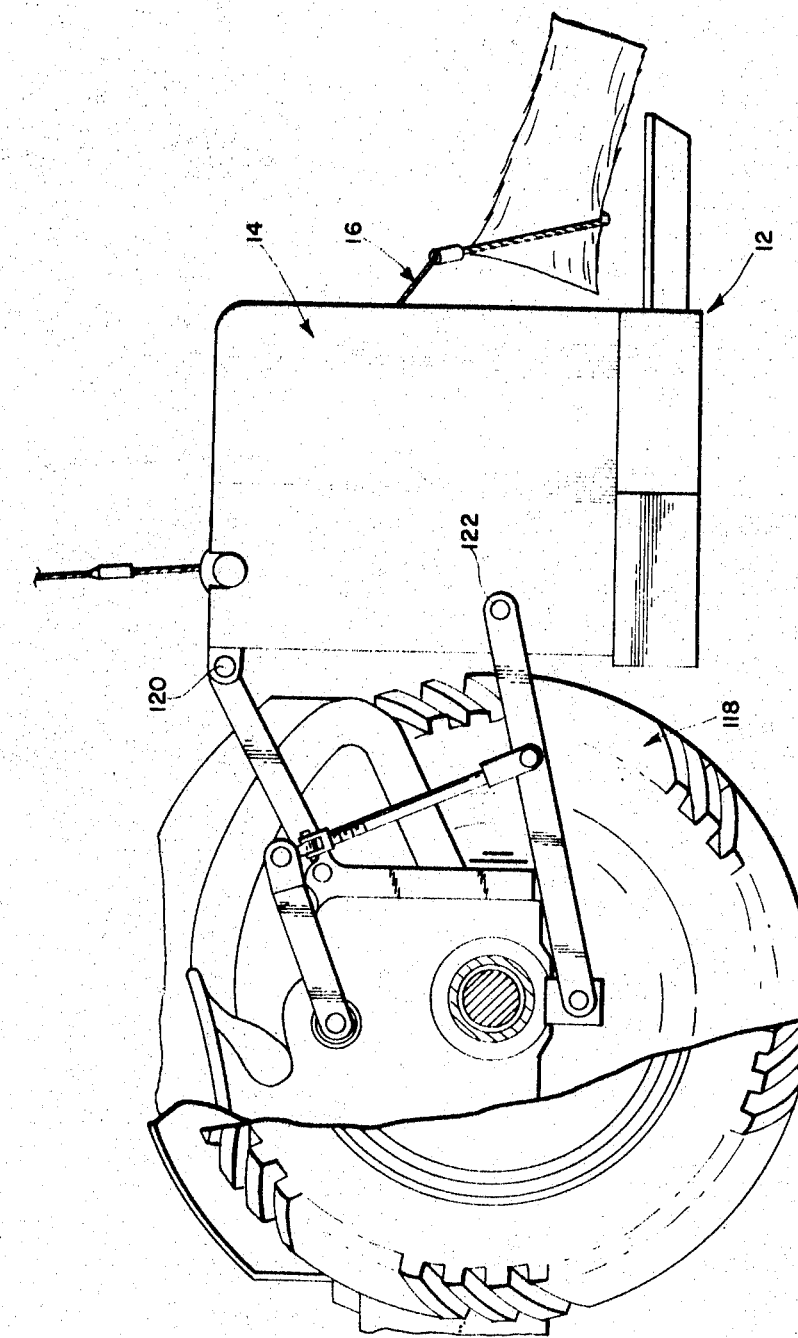

3,460,594
TREE HARVESTING APPARATUS AND METHOD
Harvey Donovan Burkhalter, Ruston, La., assignor to T. L. James & Company, Inc., Ruston, La., a corporation of Louisiana
Filed Oct. 4, 1966, Ser. No. 584,129
Int. Cl. B27c 9/00
U.S. Cl. 144—3                    15 Claims

ABSTRACT OF THE DISCLOSURE

A tree harvesting tractor attachment including a shear for severing standing trees and a logging arch for cooperating with a flexible connector for skidding the felled trees to a collection point. The flexible connector ends are fitted with enlargements which may be engaged with a choker slidable along the connector to form a tree-encircling loop, and other enlargements along the length of the connector may be selectively engaged with the arch to vary the length of the connector portion between the arch and the loop. The tractor is positioned adjacent a tree; the connector loop is attached to the tree; the shear is operated to sever the tree; the arch is elevated to lift the severed end portion of the tree; and then the tractor is driven to skid the felled tree to a collection point.

---

This invention relates to methods of and apparatus for tree harvesting.

Heretofore the practice in tree harvesting, such as in pulpwood production, has been to utilize crews of men to fell a tree to be harvested, remove the top and limbs, and sectionalize or buck the felled tree into mill length at the stump site. These operations are performed prior to transporting the mill lengths to a landing for loading on a truck. In other instances a tree is felled, topped, delimbed and skidded or snaked to a concentration point, such as a cold deck, prior to bucking. Still further, in recent years, combined tree harvesting machines have been available wherein a single mobile vehicle is equipped to fell a tree, buck the felled tree, bunch or stack the mill length, and transport the same to a desired location in one integrated operation. Each of these, and other, prior methods of tree harvesting have not always been satisfactory for various reasons. For example, although the earlier manual or non-mechanized methods do not require elaborate machines, these crew methods are not generally efficient as to labor requirements and it is difficult to measure the performance of a single member of a crew. Conversely, the combined tree harvesting machines, although efficient as to labor requirements, often require large, unwielding or expensive vehicles unsuitable for selective or thinning operations. Finally, none of these methods are well suited for certain new tree harvesting techniques. In this regard, recently it has been found that by leaving the crown intact on a felled tree for a period of from one to two months, the drying process of the overall tree is advantageously accelerated. For this reason, it is not always desirable to delimb and top a tree immediately after felling. Indeed, if the whole tree is to be utilized, topping should be eliminated.

In recognition of the need for an improved method of, and apparatus for tree harvesting, it is an object of the present invention to provide a method of and apparatus for tree harvesting which substantially obviates or minimizes problems such as heretofore noted.

It is a particular object of this invention to provide a method of, and apparatus for tree harvesting which may be utilized by a single operator instead of a crew and which offers efficiency in labor requirements without requiring complex machinery.

More specifically, it is an object of this invention to provide a method of, and apparatus for tree harvesting wherein the felling and skidding steps are integrated and a single compact, uncomplicated mobile vehicle may be utilized to both fell and skid trees, the single operator of the vehicle not being required to disembark therefrom during these steps.

It is still another object of this invention to provide a method of, and apparatus for felling and skidding trees which are particularly well suited for tree harvesting techniques wherein the tree crown is not severed from the stem immediately after felling but rather is retained thereon for a period of time to accelerate the drying operation.

Another object of this invention is to provide a compact tree felling and skidding apparatus for installation on a mobile vehicle, the positioning of which prior to felling permits convenient simultaneous connection of the skidding apparatus to the tree.

A further object of this invention is to provide such a felling and skidding apparatus wherein a simple flexible connector is included instead of the usually employed logging winch, the connector being adapted to be attached to the tree and the remainder of the skidding apparatus prior to felling but does not interfere with free fall of a severed tree.

It is a further object of this invention to provide a flexible connector adapted for use with a felling and skidding apparatus including a combined tree shear and a rigid skidding arch, the connector being adjustable and adapted to be conveniently connected and disconnected to the arch and to the tree.

Another object of this invention is to provide a felling and skidding apparatus comprising a combined tree shear and an integral logging arch, the operation of one not interfering with the operation of the other.

Still another object of this invention is to provide such a combined shear and logging arch, elevation of the shear causing elevation of the logging arch and a portion of any tree connected thereto.

In achieving these and other objects as will become apparent hereinafter, the present invention provides a method and simplified apparatus for tree harvesting comprising tree severing means for severing a standing tree, and tree skidding means operatively associated with the tree severing means. The tree skidding means is adapted to be conveniently connected to a standing tree prior to severing the same by the severing means. The tree skidding means, although connected to the tree prior to severing, permits the severed tree to fall by gravity in an unhindered manner.

A clearer understanding of the invention may be had be reference to the following detailed description and the drawings forming a part thereof, in which:

FIGURE 5 is a perspective view, on a slightly enlarged scale, of the skidding arch assembly of the combined tree shear and skidding arch shown in FIGURE 3;

FIGURE 6 is a fragmentary view, partially in cross section, on a greatly enlarged scale, of the arch beam of the skidding arch assembly shown in FIGURE 5 with a fragmentary view of a flexible connector positioned for connection to the arch element;

FIGURE 11 is a side view of the combined tree shear and skidding arch shown in FIGURE 3 attached to a standing tree by the flexible connector shown in FIGURE 7 and mounted on a rubber tired tractor, portions of which are broken away for convenience in illustration, the combined shear arch being shown in a lowered or severing position;

FIGURE 12 is a side view similar to FIGURE 11 but wherein the combined shear arch is shown in an elevated or skidding position.

Figure 1A:
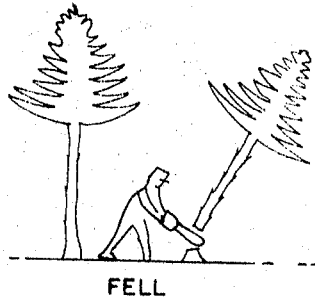
FIGURES 1a–1e are schematic views representing, in sequence, one prior method of harvesting trees.
Figure 1B:
Figure 1C:
Figure 1D:
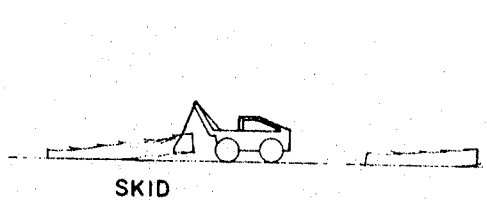
Figure 1E:
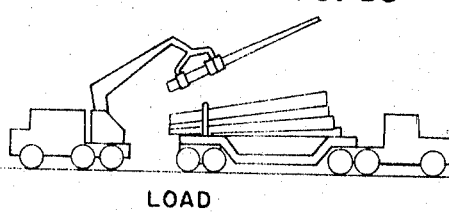

Referring in detail to FIGURES 1a to 1e of the drawings, a schematic representation of one prior method of tree harvesting is shown. The practice basically comprises felling a tree to be harvested, as with a chain saw 1 shown in FIGURE 1, delimbing the tree (FIGURE 1b), topping the tree (FIGURE 1c), skidding or snaking the stem of the tree to a bunching or concentration point by utilization of a tractor equipped with a logging arch 3 (FIGURE 1d) and loading the tree by any suitable means on a truck for transportation to a mill (FIGURE 1e). In a production operation, each of these steps is usually performed by a crew, with the necessity of balancing the workoutput of a crew performing one step with the work output of other crews performing other steps.

Alternately, complex units such as the Bush combine or Beloit Spruce harvester have been utilized to perform several or all of the phases outlined above in an integrated manner. Such units usually include means for rigidly connecting the unit to a standing tree, means to sever the tree, means to lower the severed tree to the ground, and means to automatically delimb and top the tree in one continuous operation.

For various reasons, these and other prior methods of tree harvesting are not well suited for certain new tree harvesting techniques. For example, recently, it has been found that by felling a tree and permitting the tree to dry for a period of time ranging from one to three months with the crown intact, the time interval depending upon species, seasonal and environmental conditions, the drying process of the felled tree is accelerated because the crown with the leaves or needles thereon, acts as a wick to absorb moisture from the stem and transfer it to the atmosphere. By this technique, tree weight reductions of as much as 30 percent are achieved without substantial tree deterioration. Consequently, it is not desirable to delimb or top the tree immediately after felling. The present invention provides a method of, and apparatus for tree harvesting well suited for such new techniques, and ones wherein the entire tree is utilized, as well as providing advantages over the prior methods following conventional tree harvesting techniques.

Referring to FIGURES 2a to 2e, applicant's method and apparatus are schematically illustrated. The apparatus basically comprises a prime mover 10, such as a rubber-tired or track-type tractor, on the rear end of which is mounted a hydraulically actuated, vertically adjustable tree shear 12 for severing a standing tree. A skidding arch 14 is fixed to the shear and a flexible connector 16, such as a wire rope log choker is provided to flexibly connect the rear end of the prime mover to the tree prior to felling. Positioned on the upper end of a conventional headache rack 18 which protects the prime mover operator is a hydraulic cylinder push unit 20, the outer end of the rod of which is adapted to contact a tree to urge the tree to fall away from the tractor.

Figure 2A:
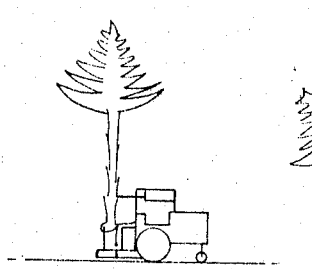
FIGURES 2a–2e are schematic views representing, in sequence, a method of harvesting trees according to the present invention.
Figure 2B:
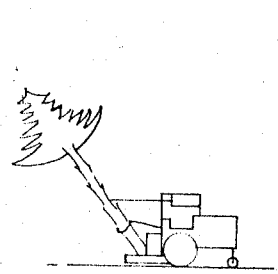
Figure 2C:
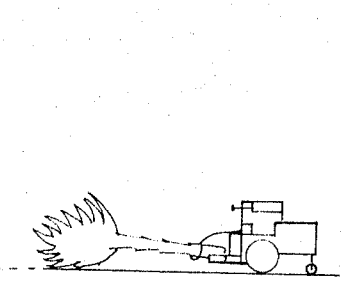
Figure 2D:
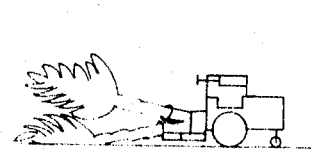
Figure 2E:
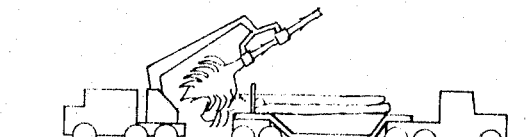

By utilization of this apparatus as shown in FIGURE 2a, the prime mover may be backed to a point adjacent a standing tree to be felled and the combined shear arch lowered to position the shear cutting elements to embrace the base of the tree just above leaf litter level. The flexible connector 16 may then be connected to the tractor and the standing tree prior to severing. Such connection may be achieved without requiring that the operator dismount from the prime mover. As shown in FIGURE 2b, the operator actuates the tree shear to sever the standing tree and extends the hydraulic push arm to urge the tree to fall in a direction away from the tractor. The flexible connector 16 which remains attached to the tree permits the tree to fall by gravity in an unhindered manner. After vertically raising the combined shear arch, the tree, with the crown intact, may then be skidded to a concentration point as suggested in FIGURE 2c. Raising the combined shear arch serves to elevate the butt end of the tree for convenience in skidding. It will be seen that the steps of tree severing and tree skidding are integrated without resorting to complex apparatus wherein a tree is lowered to the ground after severing. By utilization of apparatus discussed in more detail hereinafter, several trees with crowns intact may be simultaneously skidded to a concentration point (FIGURE 2d). The trees with the crowns intact may be left in this condition at the concentration point for a period up to two months. After a desired drying period, any suitable loading apparatus 22 may be utilized to load the tree with crown intact on a suitable transportion vehicle 24 for transportation to a mill, as shown in FIGURE 2e.

Figure 3:
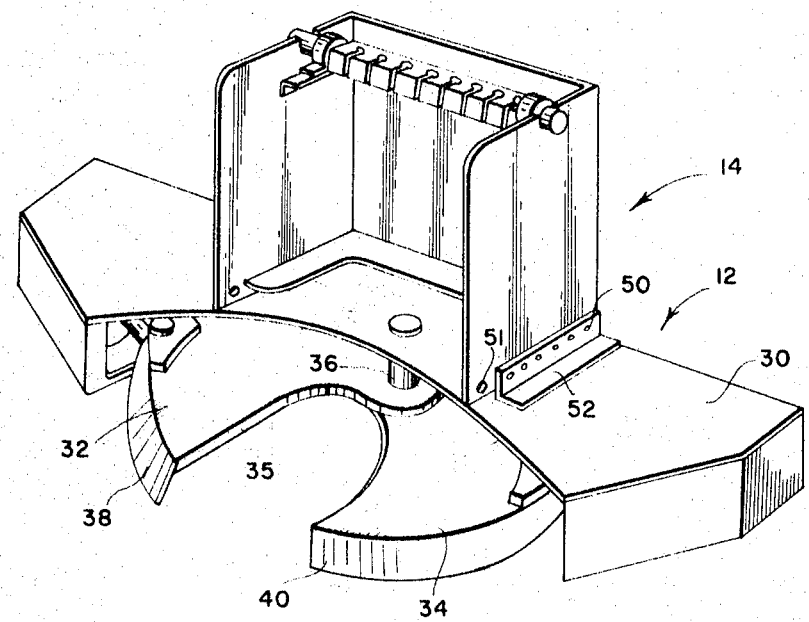
FIGURE 3 is a perspective view of a combined tree shear and skidding arch according to the present invention particularly suited for practicing the method of tree harvesting shown in FIGURES 2a–2e.

Referring now to FIGURE 3, applicant's inventive apparatus for practicing the method shown in FIGURES 2a–2e will be considered in detail. The shear assembly 12, which is adapted to be mounted on the rear of a tractor, comprises a box-like shear frame 30 to a central portion of which a pair of generally moon-shaped, scissor-like shear blades 32 and 34 are pivotally connected by a vertically extending pivot pin 36. The shear blades have sharpened inner peripheries 35 and project from the rear end of the frame in spaced relation for embracing a standing tree to the rear of the device. Positioned on the lateral outer peripheries of the shear blades 32 and 34 are generally outwardly and downwardly inclined blade flanges 38 and 40. These flanges are so inclined to allow for tree butt swell, i.e. a larger diameter of a standing tree adjacent the lowermost portion thereof.

Figure 4:
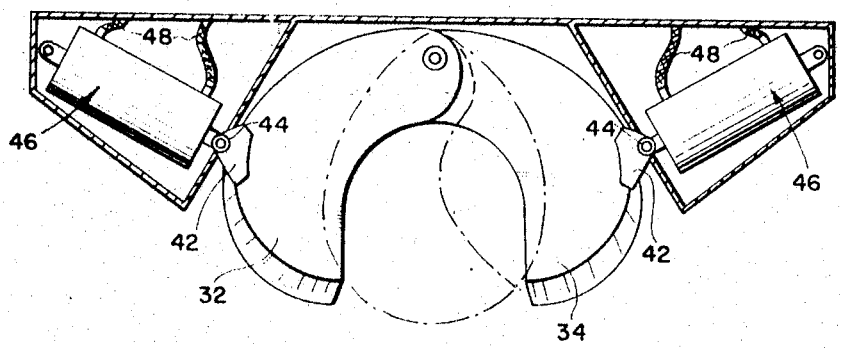
FIGURE 4 is a top, cross-sectional view, taken along lines 4—4 in FIGURE 3, of the tree shear assembly of the combined tree shear and skidding arch shown in FIGURE 3.

As best shown in FIGURE 4, the outer periphery of each blade 32 and 34 is provided with an ear 42 to which is pivotally connected the outer end of a rod 44 of a pair of opposed, conventional, double acting, hydraulic cylinder assemblies 46. The cylinder assemblies are pivotally mounted within and protected by the shear frame 30 at approximately 45° from the lateral axis thereof. Suitable hydraulic lines 48 are provided to connect the rod and piston ends of the hydraulic cylinder assemblies 46 to a conventional hydraulic valve, hydraulic pump and reservoir provided on the tractor on which the device is mounted. As shown in phantom lines in FIGURE 4, extension of the cylinder assemblies 46 by directing hydraulic fluid to the piston side thereof pivots the blades, in scissor-like fashion, about the pivot pin 36 to a converged position for severing a standing tree in a conventional manner.

The arch assembly 14 is positioned on the shear assembly 12 forwardly of the cutting edges of the shear blades and is rigidly but removably connected to a pair of laterally spaced, L-shaped brackets 52 fixed on the upper surface of the shear frame 30 by a plurality of suitable fasteners 50, such as threaded nuts and bolts, positioned in apertures 51 in the lower end of the arch assembly and in the brackets. By removal of the fasteners 50, the shear assembly may be quickly uncoupled from the arch assembly.

Referring to FIGURE 5, the arch assembly comprises a vertically extending channel-shaped frame 54, which opens rearwardly and is reinforced about its lower inner end by a U-shaped gusset 55. The frame 54 comprises a lateral wall 56 to the ends of which side walls 57 are rigidly fixed. On the upper end of the inner surface of the side walls 57, inwardly extending flanges 58 are fixed. On the upper surface of the flanges 58, pillow blocks 60 are fixedly mounted. Rotatably mounted in and between the pillow blocks 60 is an arch beam 70 having a plurality of laterally spaced counter-bored slots 72 along the length thereof. A helical spring 74 is fixed to one longitudinal end of the arch beam 70 and arch frame side wall 67 in such a manner so as to urge the slots 72 to a generally vertically oriented position. As best seen in FIGURE 6, each of the slots 72 comprises a vertically extending, generally cylindrical, counter-bored passage 76 having an enlarged portion 78 and a relatively reduced diameter portion 80. Communicating with the passage 76 on the rear of the arch beam 70 is a vertically extending slot 82 of a generally rectangular cross section having a width substantially equal to the diameter of the reduced portion 80 of the passage 76.

Figure 7:
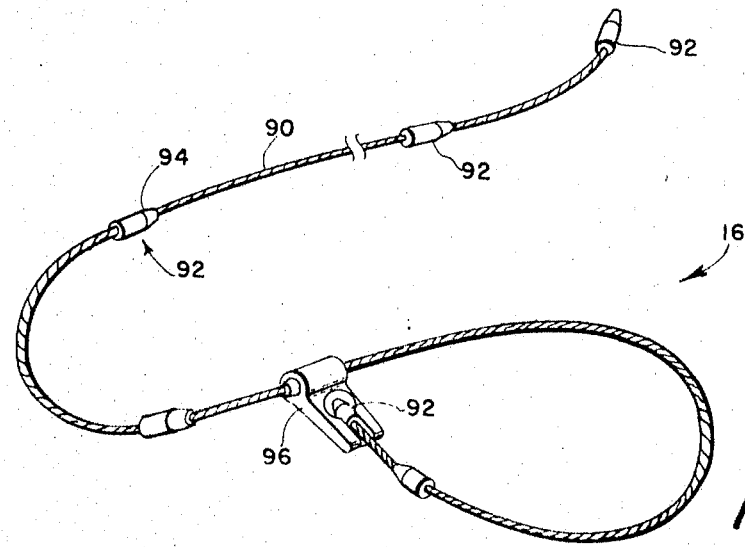
FIGURE 7 is a perspective view of a choker-like, flexible connector adapted to be connected to the skidding arch and a standing tree according to the present invention.
Figure 8:
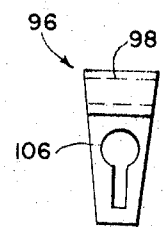
FIGURE 8 is a front elevational view of an overriding choker positioned on one end of the flexible connector shown in FIGURE 7.
Figure 9:
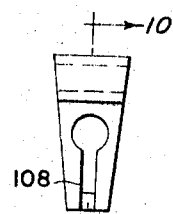
FIGURE 9 is a rear elevational view of the overriding choker shown in FIGURE 8.
Figure 10:
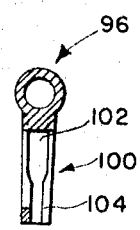
FIGURE 10 is a side elevational view of the overriding choker shown in FIGURE 8.

To connect the arch assembly 14 to a tree, the present invention provides a flexible connector 16 particularly adapted for this purpose. Referring to FIGURE 7, the flexible connector 16 comprises a length of braided wire rope 90 of approximately ¼ inch diameter having a plurality of cylindrical projections 92 spaced at about one foot intervals along the length and at each longitudinal end of the wire rope. Each cylindrical projection includes a frustoconical portion 94 converging toward and on the end thereof nearest the most closely adjacent longitudinal end of the wire rope. Freely slidably positioned about the wire rope 90 is an overriding choker 96. As best seen in FIGURES 8–10, the overriding choker 96 includes a laterally extending bore 98 dimensioned to freely and slidably receive the wire rope and override the projections 92 thereon. On the lower end of the choker, a vertically extending counter-bored passage 100 is provided. The passage 100 includes a generally cylindrical enlarged portion 102 of a substantially like diameter as the diameter of the cylindrical projections 92 of the connector 16 and a lower, reduced diameter portion 104 of a diameter substantially equal to the diameter of the wire rope. A generally cylindrical transverse bore 106 extends from the front to the rear of the choker in communication with the enlarged portion 102 of the passage 100 and a generally rectangular slot 108, the width of which is generally or substantially to the diameter of the wire rope, is provided in the front face of the choker.

To connect the arch assembly 14 to a standing tree, depending upon the desired effective length of the flexible connector, any of the projections 92 adjacent one longitudinal end of the wire rope 90 may be positioned in a counter-bored passage 76 of the arch unit 70 in a manner suggested in FIGURE 6. A portion of the wire rope between the projections 92 is slipped through the slot 82 into the passage 76. So positioned, the wire rope is moved downwardly to seat the adjacent projection in the enlarged portion 78 of the passage 76. The passage 76 is maintained in a generally vertical position convenient for wire rope insertion by the action of the spring 74 on the arch beam 70. The other longitudinal end of the flexible connector 16 may be wrapped around a tree and the projection 92 adjacent this longitudinal end of the wire rope is inserted in the choker 96 so as to be retained in the enlarged portion 102 of the passage 100 of the choker. In this manner, the longitudinal end of the flexible connector is formed into a loop which may be positioned about the tree by sliding the wire rope 90 and projections 92 through the laterally extending bore 98 in the upper end of the choker until the loop is snug about the periphery of the tree.

Installation and operation of applicant's combined shear arch will be apparent from a perusal of FIGURES 11 and 12. The combined shear arch may be mounted on the rear end of any conventional rubber tired tractor of the type including a conventional three point hitch and lift mechanism 118 of either the series one or two (narrow and wide) category. To facilitate such mounting, appropriately positioned pivot mounting may be provided on the arch assembly 14. One such pivot mounting 120 is positioned on the forward face of the lateral wall 56 of the arch frame 54 at the upper central portion thereof. Two laterally spaced pivot mountings 122 are positioned on the frame 54 subjacent the upper pivot mounting 120. Suitable hydraulic fluid conduits may be utilized to connect the shear hydraulic cylinder assemblies 46 to a conventional tractor hydraulic system.

To operate the device a tractor operator need merely position the tractor so that the diverged shear blades 32, 34 embrace the base of a standing tree. The flexible connector 16 may then be positioned by fixing one end thereof in the arch beam 70, as heretofore described, and looping the other end thereof about the standing tree. Upon severing the tree by causing the shear blades to converge in scissor-like fashion, the tree is permitted to fall by gravity while the flexible connector 16 remains attached thereto.

As shown in FIGURE 12, subsequent to felling the tree, the combined shear arch may be raised to thereby elevate the butt end of the tree to a position concenient for skidding. After skidding the first tree to a position adjacent a second tree to be felled, the operation may be repeated. However, a second flexible connector is utilized to connect the second tree to the arch assembly 14 by fixing one end of the second flexible connector in any of the remaining vacant slots 72 in the arch beam 70. By utilization of a number of flexible connectors, as many trees may be simultaneously skidded as available tractor power and conditions permit.

As will be apparent from the description of the combined shear arch of this invention, the arch assembly 14 may be removed from the shear assembly 12 when only a skidding operation is to be performed by removal of connectors 51 fixing the arch assembly to the shear assembly.

Figure 13:
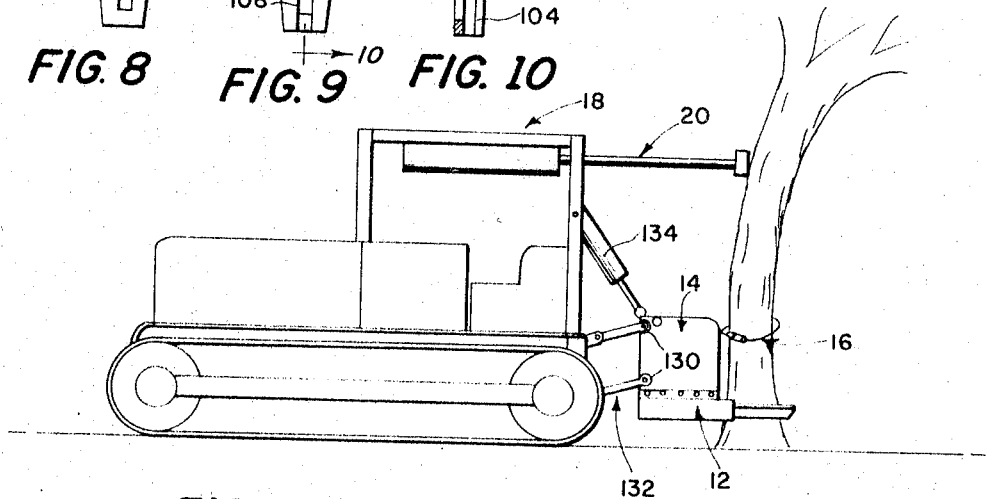
FIGURE 13 is a schematic side view of the combined shear arch shown in FIGURE 3 mounted on a track-type on the upper end of which is positioned a hydraulic push unit.

The combined shear arch of the present invention may be mounted on a track-type tractor of the type including a four point or parallel linkage hitch. As shown in FIGURE 13, a pair of vertically spaced pivot mountings 130 may be provided on each side of the arch frame 54 for connection to four links 132 of the hitch. A suitable hydraulic lift cylinder assembly 134 may be attached to a conventional tractor headache rack 18 and to the arch assembly 14 adjacent the upper end thereof. The hydraulic push cylinder unit 20, fixed to the upper end of the headache rack may be extended in a horizontal plane during tree severing to urge the tree to fall away from the tractor.

As will be appreciated, the instant method and apparatus for tree harvesting permits utilization of a labor saving shear arch combination of a type making it unnecessary for the operator to dismount from the tractor during the shearing and skidding operation. Positioning of the shear prior to the shearing operation permits convenient simultaneous connection to the tree to be skidded. Further, the need for a logging winch is eliminated in that the shear lift mechanism serves to elevate the butt end of trees to be skidded. But still further, because the connection to the tree permits the tree to fall by gravity, it is not necessary to incorporate a structurally heavy tree connector or clamp to restrain free fall and to lower the tree to the ground. This concept permits a much lighter feeling and skidding unit than has heretofore been utilized.

It has been found that the instant method and apparatus invention is particularly meritorious in a selective timber harvesting operation. Because labor requirements are minimized, it is practical to employ a diagnostically skilled tractor operator who not only selects trees to be felled but also fells and hauls the same without substantial physical exertion.

While the invention has been described with reference to a preferred embodiment of the method and apparatus, it will be apparent to those skilled in the art that additions, deletions, modifications, substitutions and other changes in the specifically described and illustrated embodiments may be made which fall under the purview of the appended claims.

I claim:

1. A tree harvesting apparatus for installation a mobile vehicle for felling and skidding trees, said apparatus comprising, in combination,
   tree severing means for severing a standing tree,
   and tree skidding means permitting connection to a standing tree prior to severing the same by the severing means and permitting the severed tree to fall by gravity in a free, unhindered manner, said tree skidding means including
      flexible means for said connection to a standing tree, and
      a rigid arch fixedly connected to said tree severing means, said arch and said tree severing means being adapted to be simultaneously elevationally adjusted relative to the mobile vehicle,
      said arch including connecting means for releasable connection with said flexible means.

2. A tree harvesting apparatus according to claim 1 wherein,
   said arch includes a horizontally disposed beam, said connecting means defined by at least one slotted, counter-bored passage in said beam,
   said flexible means including at least one projection means releasably seated in said passage.

3. A tree harvesting apparatus adapted to be installed on a mobile vehicle for connecting the vehicle to a tree by utilization of a flexible connector, said apparatus comprising,
   tree severing means for severing a standing tree,
   a rigid arch frame fixedly connected to said severing means, said arch frame including a generally horizontally disposed beam positioned in an elevated position relative to said severing means, said beam including a plurality of spaced connecting means any of which are adapted to connect the flexible connector to the vehicle.

4. A tree harvesting apparatus according to claim 3 wherein said plurality of connecting means includes at least one slotted, counter-bored passage in said beam.

5. A tree harvesting apparatus according to claim 4 further including spring means connected to said beam to urge the same to a position wherein said passage is generally vertically oriented.

6. A tree harvesting apparatus according to claim 5 wherein said arch frame further comprises spaced, vertically extending uprights, said uprights having lower ends fixedly connected to said severing means, said beam being connected between upper ends of said uprights, said beam further including a plurality of spaced counter-bored passageways therethrough and slots leading to said passageways, and a flexible connector adapted to be connected to said arch frame and a standing tree, said flexible connector comprising a flexible strand of material, means for attaching a first end of said strand about a tree, and a plurality of spaced projections on the other end of said strand, one of said projections received in one of said counter-bored passages in said beam and removably retained therein.

7. A tree harvesting apparatus according to claim 6 wherein said severing means comprises a shear frame, a pair of shearing blades connected to said shear frame, at least one of said shearing blades pivotally connected to said shear frame for pivotal movement in a horizontal plane, and hydraulic cylinder means connected to said shear frame and to at least said one of said shearing blades to pivot the same.

8. A method of tree harvesting utilizing a mobile vehicle equipped with tree severing means and tree skidding means, said method comprising,
   connecting a standing tree to be severed to said tree skidding means,
   felling the standing tree by severing the same,
   permitting the severed tree to fall by gravity in a free and unhindered manner while connected to the skidding means,
   and skidding the felled tree to a remote location.

9. A method of tree harvesting according to claim 8, said method further including,
   elevating the tree severing means to thereby elevate a portion of the felled tree prior to skidding,
   said skidding being performed with the top of the tree remaining intact.

10. A skidding arch adapted for installation on a mobile vehicle including a plurality of lift links, said arch comprising a frame having laterally spaced side walls, a generally horizontally disposed beam spanning said side walls, said beam including a plurality of counter-bored passages and slots leading to each of said passages, each adapted to receive a flexible connector, said frame including pivot mounting means each adapted to pivotally receive one of the plurality of lift links.

11. A skidding arch according to claim 10 wherein said beam is rotatably mounted on said frame, and further including spring means urging said beam to a position wherein said passages are generally vertically oriented.

12. A skidding arch having at least one recess therein having a logging choker removably connected to said arch, said choker comprising,
   a flexible strand of rope-like material,
   connection means for attaching a first end of said strand to a log,
   a plurality of spaced first projections on the other end of said strand, one of said first projections being received in said recess in said logging arch.

13. A skidding arch according to claim 12 wherein said logging arch comprises a rigid frame adapted to be attached to a mobile vehicle,
   said frame including a horizontally disposed beam, said beam including a plurality of said recesses in spaced relation for connecting a plurality of flexible connectors to said beam.

14. A skidding arch according to claim 13 wherein, said connection means includes an overriding choker having a transverse bore freely receiving said strand and said first projections, and a second projection on said other end of said strand, said second projection adapted to be removably positioned in a counter-bored passage in said choker.

15. A logging choker comprising a length of wire rope, a plurality of projecting members of a relatively increased diameter spaced along said length of wire rope, and adjacent both longitudinal ends thereof, and an overriding choker element having a bore therethrough freely receiving said wire rope and at least certain of said projecting members, said choker element including a countersunk recess, said recess including an enlarged portion substantially of a like size as the projecting member at one longitudinal end of said wire rope and a reduced portion aligned and communicating with said enlarged portion, said reduced portion being substantially the same size as the diameter of said wire rope.

(References on following page)

References Cited

UNITED STATES PATENTS

| | | | |
|---|---|---|---|
| 1,656,676 | 1/1928 | Mills | 294—74 X |
| 3,122,184 | 2/1964 | Larson | 144—34 |
| 3,183,953 | 5/1965 | MacMillan et al. | 144—34 |
| 3,276,809 | 10/1966 | Vaines et al. | 294—78 X |
| 3,277,936 | 10/1966 | Larson | 144—34 |
| 3,289,259 | 12/1966 | Laharty | 294—74 |
| 3,294,131 | 12/1966 | Larson | 144—34 |
| 3,319,990 | 5/1967 | Beal | 294—74 |
| 3,340,912 | 9/1967 | Williams et al. | 144—34 X |

FOREIGN PATENTS

| | | |
|---|---|---|
| 633,681 | 1/1962 | Canada. |

WILLIAM S. LAWSON, Primary Examiner

U.S. Cl. X.R.

24—123; 144—34, 309; 214—3; 294—74, 78